United States Patent
Gosson et al.

(10) Patent No.: US 12,323,724 B2
(45) Date of Patent: Jun. 3, 2025

(54) SYSTEMS AND METHODS FOR ANALOG IMAGE SENSING AND PROCESSING

(71) Applicant: blumind Inc., Ottawa (CA)

(72) Inventors: John Gosson, Ottawa (CA); Roger Levinson, San Jose, CA (US)

(73) Assignee: blumind Inc., Ottawa (CA)

( * ) Notice: Subject to any disclaimer, the term of this patent is extended or adjusted under 35 U.S.C. 154(b) by 140 days.

(21) Appl. No.: 18/170,945

(22) Filed: Feb. 17, 2023

(65) Prior Publication Data
US 2023/0262361 A1   Aug. 17, 2023

Related U.S. Application Data

(60) Provisional application No. 63/311,281, filed on Feb. 17, 2022.

(51) Int. Cl.
*H04N 25/76*   (2023.01)
*H04N 25/772*  (2023.01)

(52) U.S. Cl.
CPC ....... *H04N 25/7795* (2023.01); *H04N 25/772* (2023.01)

(58) Field of Classification Search
CPC .. H04N 25/7795; H04N 25/772; H04N 25/00; H04N 25/47
See application file for complete search history.

(56) References Cited

U.S. PATENT DOCUMENTS

| | | | | |
|---|---|---|---|---|
| 6,067,113 A | * | 5/2000 | Hurwitz | H04N 25/76 348/E3.018 |
| 6,753,912 B1 | * | 6/2004 | Wayne | H04N 25/60 348/E3.018 |
| 6,885,331 B2 | * | 4/2005 | Krymski | H04N 25/78 341/172 |
| 9,967,479 B2 | * | 5/2018 | Matolin | H04N 25/00 |
| 2011/0141078 A1 | * | 6/2011 | Raynor | G01J 1/18 250/252.1 |
| 2012/0127356 A1 | * | 5/2012 | Matsuura | H04N 25/75 348/E3.016 |
| 2013/0088242 A1 | * | 4/2013 | Lundstrum | H03K 17/9622 324/609 |
| 2013/0322861 A1 | * | 12/2013 | Saito | G03B 5/00 396/55 |

(Continued)

OTHER PUBLICATIONS

International Search Report from corresponding PCT application No. PCT/CA2023/050210.

(Continued)

*Primary Examiner* — Chiawei Chen
(74) *Attorney, Agent, or Firm* — Own Innovation Inc.; James W. Hinton

(57) ABSTRACT

Analog image processing systems and methods are provided. The systems are configured to convert a pixel output signal to a time pulse without analog to digital signal conversion. Pixel output voltage is sampled and the pixel voltage is applied to a capacitor. A comparator configured to sense the pixel voltage on the capacitor as the capacitor is discharged generates output time pulses. The output time pulse is proportional to the pixel voltage and may be processed by an all-analog neural network to perform functions such as object detection, object classification, image quality enhancement and always-on image processing with low power consumption.

18 Claims, 6 Drawing Sheets

(56) References Cited

U.S. PATENT DOCUMENTS

| | | | | |
|---|---|---|---|---|
| 2014/0201126 A1* | 7/2014 | Zadeh | .................... | A61B 5/165 |
| | | | | 706/52 |
| 2015/0036032 A1* | 2/2015 | Itano | ..................... | H04N 25/78 |
| | | | | 348/301 |
| 2015/0189214 A1 | 7/2015 | Kurose | | |
| 2018/0070038 A1 | 3/2018 | Geurts et al. | | |
| 2019/0115931 A1* | 4/2019 | Hurwitz | ................. | H04N 25/78 |
| 2020/0106972 A1* | 4/2020 | Matolin | ................ | H04N 23/71 |
| 2020/0110987 A1* | 4/2020 | Schie | ...................... | H03K 5/04 |
| 2020/0145593 A1* | 5/2020 | Gao | ..................... | H04N 25/772 |
| 2020/0221040 A1* | 7/2020 | Berner | .................. | H04N 25/47 |
| 2023/0097217 A1* | 3/2023 | Rasch | ................... | G06N 3/045 |
| | | | | 706/25 |
| 2023/0243697 A1* | 8/2023 | Chen | ........................ | G01J 1/46 |
| | | | | 250/214 A |

OTHER PUBLICATIONS

Du et al. "An Analog neural Network Computing Engine Using CMOS-Compatible Charge-Trap-Transistor (CTT)", Jul. 24, 2018, https://ieeexplore.ieee.org/document/8418745.

* cited by examiner

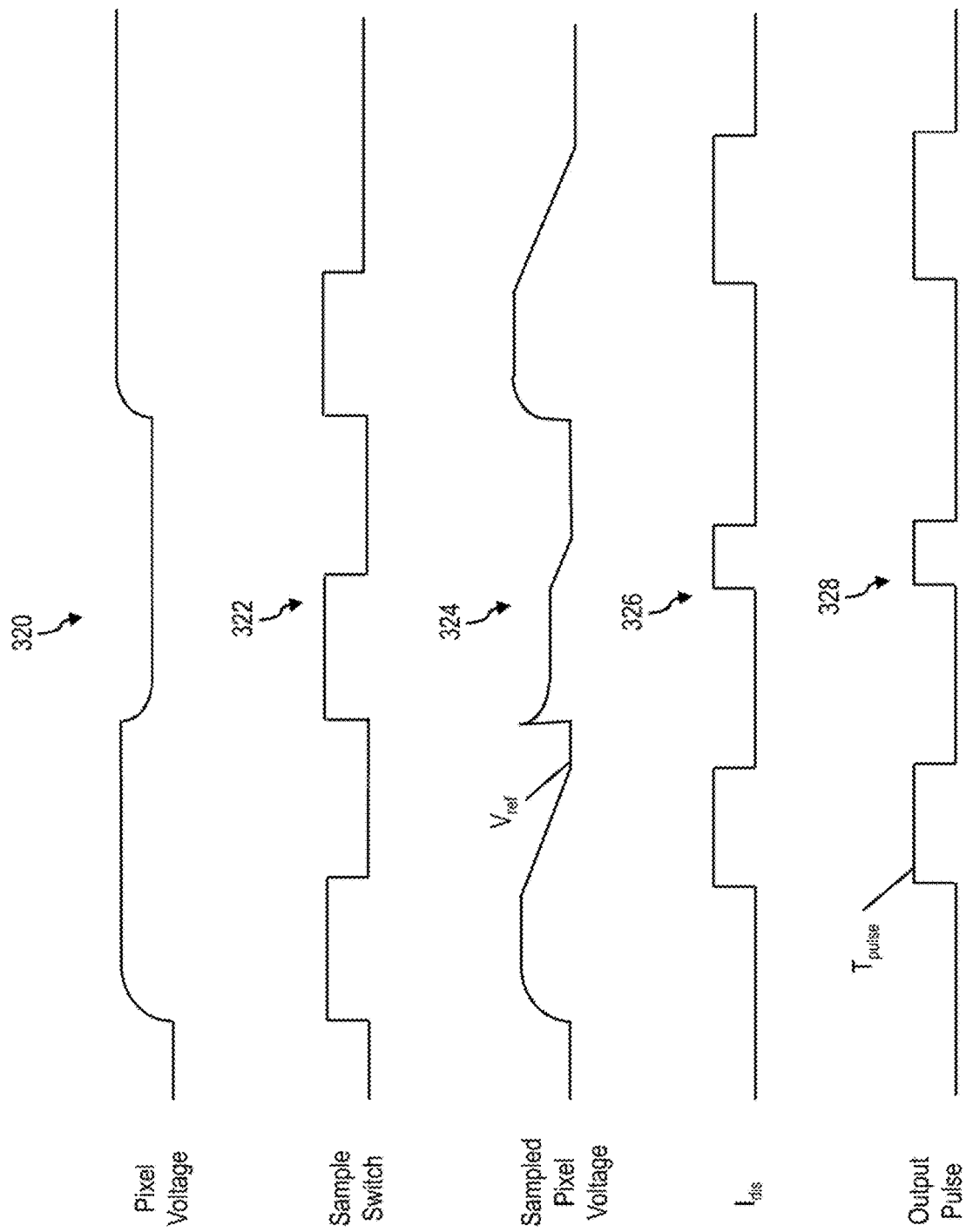

SYSTEMS AND METHODS FOR ANALOG IMAGE SENSING AND PROCESSING

TECHNICAL FIELD

The embodiments disclosed herein relate to image sensing and processing technology, and, in particular to systems and methods for all-analog image processing.

INTRODUCTION

A typical complementary metal-oxide semiconductor (CMOS) image sensor array 100 is shown in FIG. 1. Each pixel in the sensor array 100 is constructed of a photo-diode which integrates charge onto a capacitor to generate a voltage on the capacitor proportional to the intensity of the sensed light. Each pixel's voltage is selected by a row and column addressing scheme to present each individual pixel value to the output through an output amplifier. In typical systems today, the output voltage is then digitized by an analog-to-digital converter (ADC) to provide a binary representation of each pixel for further processing by an image signal processing function which may include artificial intelligence processing.

The typical CMOS sensor array method consumes a significant amount of power in the ADC function as well as in the subsequent data transport and transmission. In systems which require extremely low power operation, for example, battery powered camera functions for image sensing and for performing always-on image processing, the power overhead of the ADC function, data transmission and the subsequent digital signal processing in the image signal processor can be prohibitive. In addition, CMOS imagers can be utilized in systems that experience wide temperature excursions and for high temperatures that CMOS imager's performance may degrade. In such cases where high temperatures can be experienced it is critical that the CMOS imager and associated processing circuitry consume minimal power and thus generate minimal heat to minimize further raising the ambient temperature of the CMOS sensor and further degrading performance.

It is highly advantageous to improve the energy efficiency of such imaging systems by eliminating the digital processing by utilizing analog processing for critical, always-on functions and thermally sensitive applications. These functions could include person detection, face detection and specific object detection and automotive applications where the camera module is not easily cooled and can experience high ambient temperatures. Additionally, an all analog neural network could be used to improve the image quality of the CMOS imager. Accordingly, there is a need for a low-power consuming solution which directly processes the analog voltages from the image sensor and utilizes a neural network computational system to perform the always-on image processing functions.

SUMMARY

Systems and methods for all analog image processing are described. The systems are configured to convert a pixel output signal to a time pulse without analog to digital signal conversion. The output time pulse is proportional to the pixel voltage and may be processed by an all-analog neural network to perform functions such as object detection, object classification, image quality enhancement and always-on image processing with low power consumption.

According to some embodiments, there is an analog image processing system. The system comprises a pixel array comprising a plurality of pixels for sensing light and a buffer for sampling a pixel voltage output by each pixel in the pixel array. A switch passes the pixel voltage to a capacitor, wherein the pixel voltage is applied to the capacitor when the switch is on, and wherein a discharge current is applied to the capacitor when the switch is off. The system includes a comparator configured to sense the pixel voltage on the capacitor as the capacitor is discharged and generate output time pulses proportional to the pixel voltage.

According to other embodiments, there is an analog image processing system comprising a pixel array comprising a plurality of pixels, each pixel having a photo-diode for sensing light, a capacitor for storing charge generated from the photo-diode and a switch for enabling a discharge from the capacitor. A comparator is configured to sense a diode voltage on the capacitor as the capacitor is discharged and generate an output time pulse proportional to the diode voltage.

The systems disclosed herein may further comprise an analog neural network for processing the output time pulses, the analog neural network having two or more layers of neurons and synapses comprising programmable weight-storing charge-trapped transistors. The systems may further comprise a current source for supplying the discharge current, the current source calibrated to a reference discharge current by a charge-trapped transistor programming a threshold voltage shift into the current source thereby creating a shift in the discharge current.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 3B is a timing diagram of an exemplary voltage to pulse conversion in the pulse conversion circuit of FIG. 3A, according to an embodiment;

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 2:
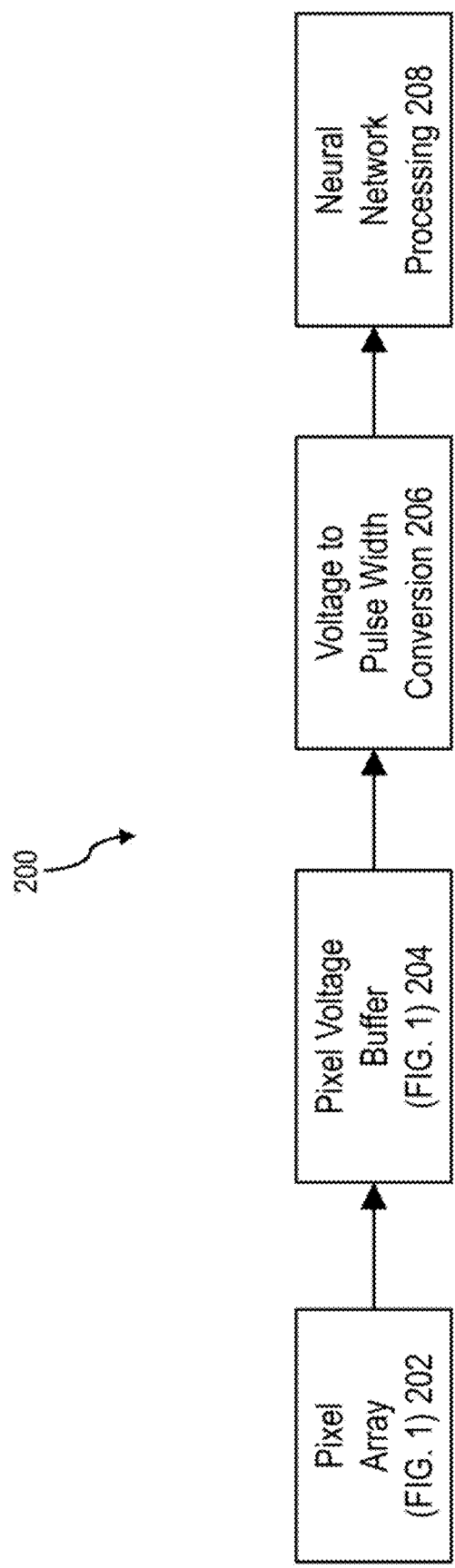
FIG. 2 is a diagram of an all-analog signal path for image processing, according to an embodiment.

Referring to FIG. 2, shown therein is a diagram of an all-analog signal pathway 200 for image processing, according to an embodiment. The all-analog signal pathway 200 may provide for low energy consumption in always-on image processing applications in battery operated devices and thermally sensitive applications. The pathway 200 may provide a method for interfacing directly to a CMOS imager with the data converter replaced by a voltage to pulse width conversion.

Figure 1:
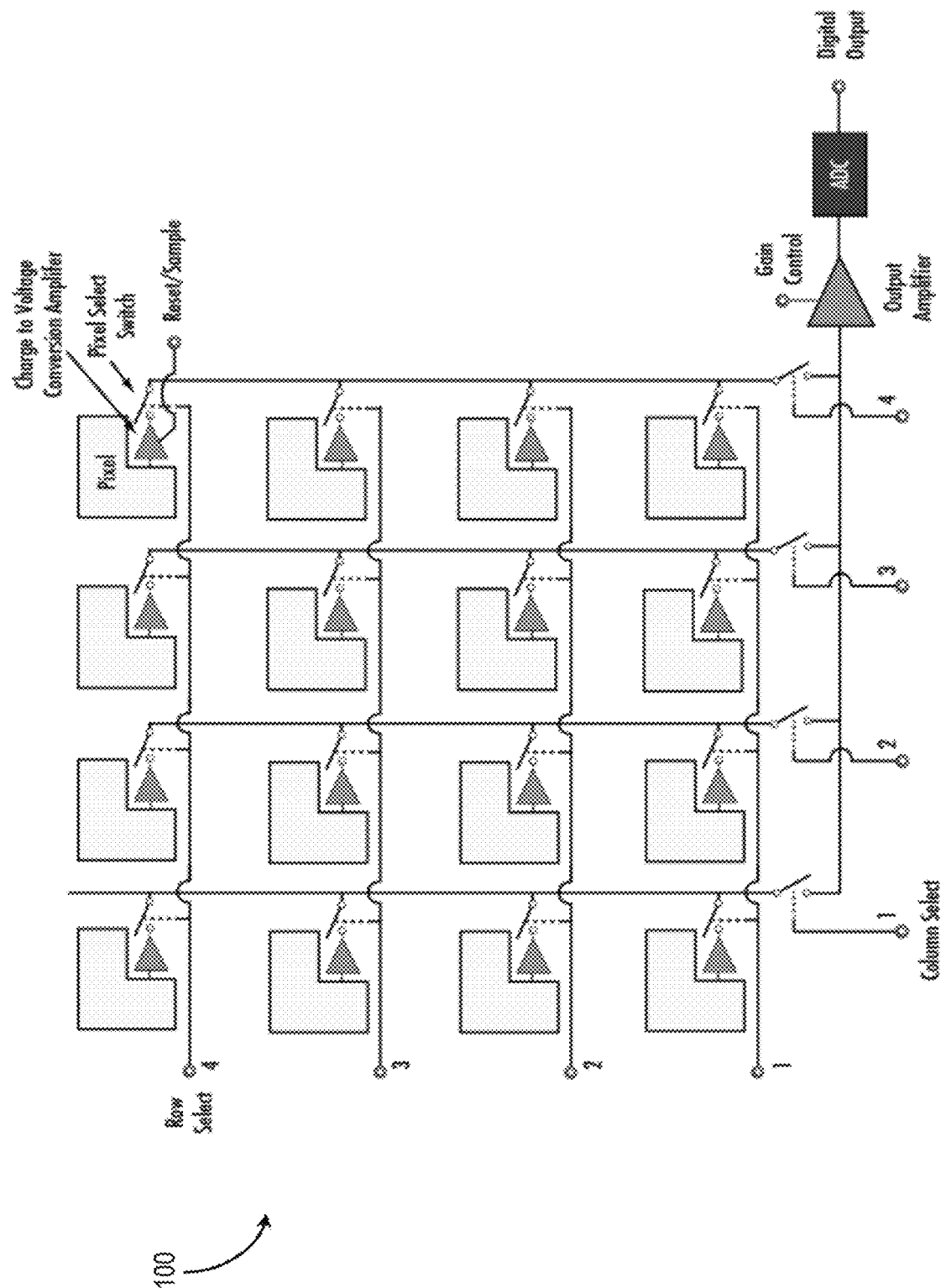
FIG. 1 is a typical CMOS image sensor array.

Considering the pixel array 100 in FIG. 1 and representing the array as a single block 202 in FIG. 2, the output of the pixel array 202 at any point in time is the output voltage of the pixel for whom the row and column have been selected. The output voltage looks like a discrete time signal which changes with each row and column selection which is often referred to as the "pixel clock rate". The pixel clock sets the rate at which pixel data is output from the array and is related to the number of pixels in the array and the video frame rate desired (see FIG. 3A)

Similar to the typical CMOS image sensor array, in the pathway 200, the discrete time voltage output from the pixel is buffered by the voltage buffer 204 in the pixel array 202. The output of the pixel voltage buffer 204 is then converted to a time pulse signal by a voltage to pulse width conversion function 206, in which the duration of the pulse in time is proportional to the pixel voltage. For example, if a 1 μs pulse width represents the maximum pixel voltage, for example 1 V, then a 500 mV voltage would generate a 500 ns pulse width, being ½ the full scale value. This has similarities in some ways to analog-to-digital conversion but with significant, important differences.

The voltage to pulse conversion 206 performs a quantization of the input voltage in time but does not digitize the voltage into a numerical representation, such as a binary representation. This maintains the full analog dynamic range of the signal and simply transforms the signal from voltage to time. The voltage to pulse conversion function can be implemented in many different technologies and in CMOS technology can achieve low power consumption on the order of 10 s of nW.

The all-analog signal pathway 200 includes a neural network processing technique 208 which utilizes time pulses to represent input signals to the neural network and internally using time pulses to represent neural network layer activations, such as described in U.S. Patent Publication No. 2022/0374698, the entirety of which is incorporated by reference herein. The neural network processing technique 208 may be implemented by an analog fully connected neural network (FCNN), an analog convolutional neural networks (CNN), or an analog recursive neural network (RNN) having two or more layers of neurons and synapses comprised of programmable weight-storing charge-trapped transistors (CTTs). Using such a neural network, it is possible to implement many types of analog image processing functions such as object detection, object classification and image quality enhancement, using minimum power. The concept can be generalized and applied to applications beyond CMOS imager-based solutions, in which analog signals carry the important information and a maximally energy efficient neural network or other analog processing solution is required.

Figure 3A:
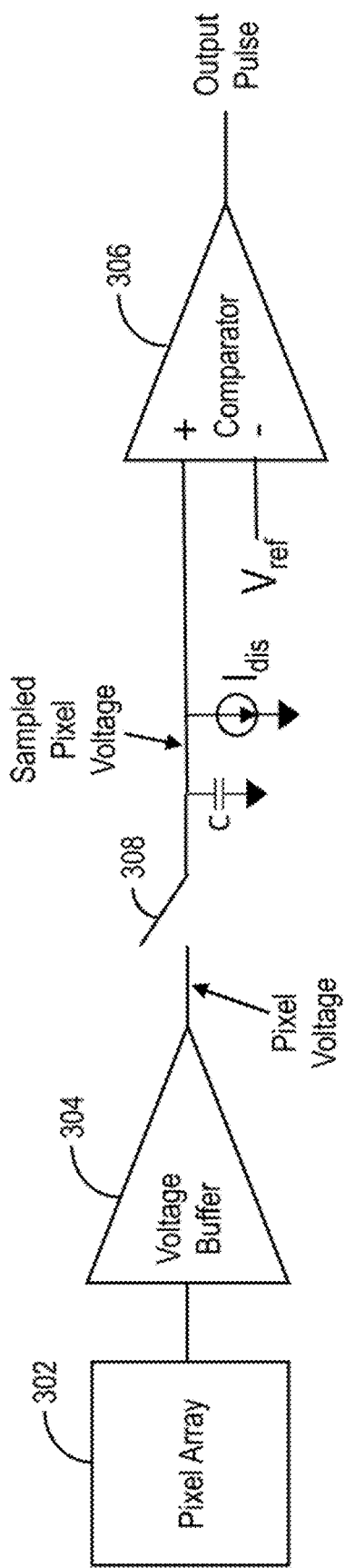
FIG. 3A is a diagram of an analog voltage to pulse conversion image processing system, according to an embodiment.

FIG. 3A shows an exemplary analog voltage to pulse conversion image processing system 300, according to an embodiment. The pulse conversion circuit 300 includes the pixel array 100 and the voltage buffer of FIG. 1, represented by the pixel array 302 and the voltage buffer 304, respectively. The output voltage of the pixel selected at the pixel clock rate (specifically selected by the row and column select in FIG. 1) within the pixel array 302 is buffered by the voltage buffer from FIG. 1, noted as "pixel voltage" in FIG. 3A, and presented to the sample and hold function shown in FIG. 3A comprised of capacitor "C" and sample switch 308. A comparator 306 is configured to sense the pixel voltage on the capacitor, C, as the capacitor is discharged and generate output time pulses proportional to the pixel voltage.

When the sample switch 308 is turned on, the pixel voltage is applied to capacitor C. When the sample switch 308 is turned off, the applied pixel voltage is held on the capacitor C until the next time the sample switch 308 is turned on. Once the sample switch 308 is turned off, the discharging current, $I_{dis}$, is applied to the capacitor, C, and at the same time, the comparator 306 is enabled which causes its output to go high generating the rising edge of the output pulse. As the capacitor, C, discharges, the voltage on the capacitor ramps down until it equals the externally provided or internally generated voltage, $V_{ref}$, at which point in time the comparator 306 output will go low generating the falling edge of the output pulse. The output pulse remains high during this process until the capacitor voltage is discharged to a level equaling $V_{ref}$. The amount of time that the output pulse voltage remains high is proportional to the sampled voltage from the pixel voltage buffer 304.

The sample switch 308 in FIG. 3A can be comprised of any type of switch available in the implementation technology. For example, in a CMOS application the switch 308 can be constructed from an N-type metal oxide semiconductor (NMOS) or P-type metal oxide semiconductor (PMOS) transistor or a CMOS switch comprised of both NMOS and PMOS transistors. The discharge current, $I_{dis}$, can be constructed of any type of current source, such as an NMOS current source available in CMOS technologies. Control signals (not shown in FIG. 3A) are implemented using standard logic techniques to enable and disable the discharge current, $I_{dis}$, and the comparator 306 output during the sampling time.

FIG. 3B shows timing diagrams 320, 322, 324, 326, 328 of an exemplary voltage to pulse conversion in the pulse conversion circuit of FIG. 3A. The topmost diagram shows the pixel voltage 320, which is the buffered voltage of the pixel selected within the pixel array. Note that the pixel rate is the period between pixel voltage changes, and is typically equivalent to the sample switch control signal 322. When the sample switch control signal 322 is high, the switch 308 is closed and the output of the pixel voltage buffer 304 is connected to capacitor, C, and the comparator 306 input. During this time both the comparator 306 and $I_{dis}$ 326 are disabled through control logic not shown in the diagram.

When the sample switch control signal 322 goes low, the sample switch 308 is opened and the capacitor, C, holds the sampled charge. Simultaneously, the $I_{dis}$ 326 and comparator 306 are enabled causing the capacitor, C, to discharge at a controlled rate set by $I_{dis}$ 326 and the comparator output 328 will go high. As the capacitor, C, discharges, the voltage 324 will drop in a linear ramp approaching a voltage equal to the reference voltage of the comparator, $V_{ref}$. Once the voltage on capacitor, C, reaches the reference voltage of the comparator 306, the comparator output 328 will switch from high to low and the control logic (not shown) will disable the $I_{dis}$ and the comparator 306. The resultant output 328 time pulse width, $T_{pulse}$, is thus proportional to the sampled pixel voltage 324. The output time pulses may be processed by a processor or an analog neural network configured for image processing.

There are many possible circuit implementations for the discharge current and the comparator 306 of FIG. 3A. In a preferred embodiment, the discharge current and the comparator 306 are similar structures to those presented in U.S. Patent Publication No. 2022/0374698. Specifically, the discharge current source may comprise a standard NMOS transistor, a NMOS charge-trapped transistor, or a combination thereof, which can be calibrated using a charge-trapped transistor (CTT) device and programming a threshold voltage shift into the NMOS current source creating a shift in the drain current and can be matched to a reference discharge current available in the overall system.

Figure 4:
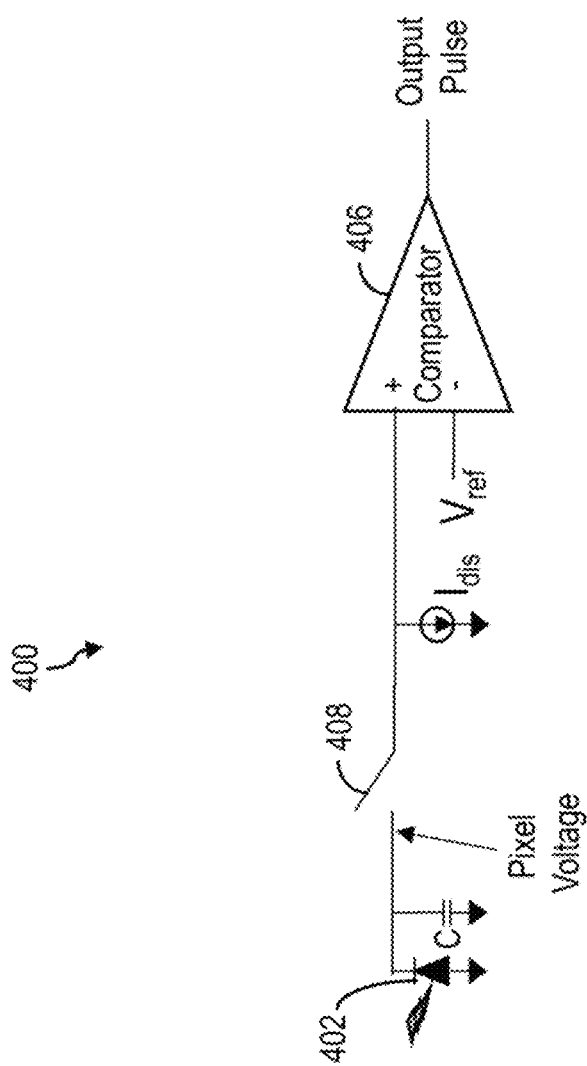
FIG. 4 is a diagram of an analog voltage to pulse conversion image processing system, according to another embodiment.

FIG. 4 shows an analog voltage to pulse conversion image processing system 400, according to another embodiment. The system 400 is similar to the system 300 shown in FIG. 3, however, the pixel voltage is output from a photo-diode 402 in a pixel array and the voltage buffer 304 is omitted. Such a system 400 may be advantageous for small image sensors with low pixel count, charge-coupled devices, or contact image sensor applications where there is no requirement for bus routing and buffering to get the pixel voltage out.

In the system 400, the pixel voltage is not sampled and the capacitor, "C," is directly discharged by the discharge current, $I_{dis}$. It should be noted that the capacitor, "C," may be integral to the photo-diode 402 or may be a separate capacitor for storing charge from a plurality of photo-diodes in the pixel array. When the switch 408 is turned on, a comparator 406 configured to sense the diode voltage on the capacitor, outputs a time pulse directly as the capacitor, C, discharges. The output time pulse may be processed by a processor or an analog neural network configured for image processing.

Figure 5:
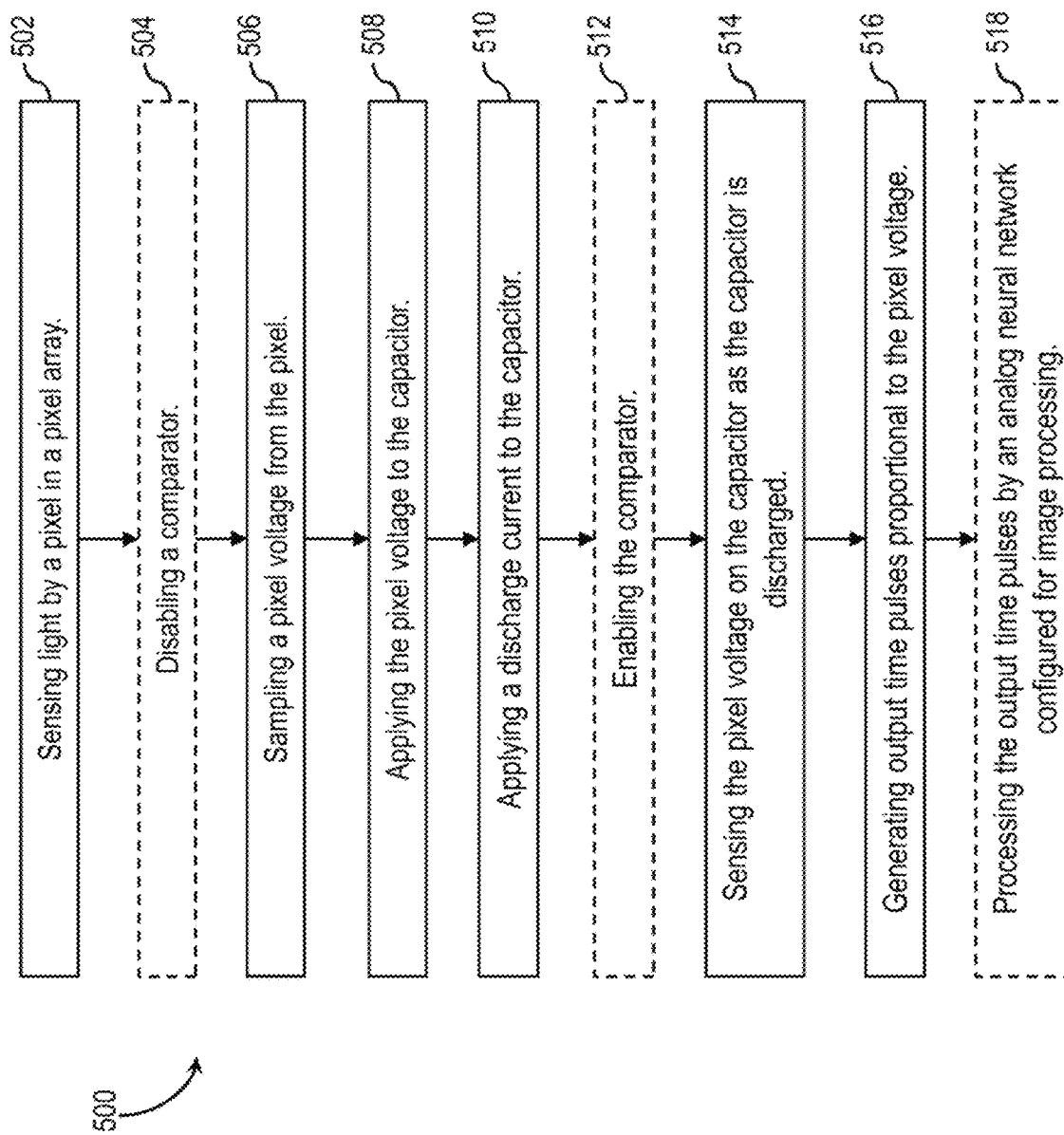
FIG. 5 is a flow diagram of an analog image processing method, according to an embodiment.

FIG. 5 shows a flow diagram of an analog image processing method 500, according to an embodiment. The method 500 may be implemented by the analog image processing system 300 shown in FIG. 3A. The elements from FIG. 3A are indicated in parenthesis for reference.

At 502, a pixel in a pixel array (302) senses light (i.e., photons).

At 504, optionally, a comparator (306) is disabled. Generally, the comparator (306) will only be disabled if was enabled (i.e., Act 512 is performed) in a prior performance of the method 500. If performed, Act 504 is performed concurrent to Act 506.

At 506, a pixel voltage from the pixel is sampled by a voltage buffer (304).

At 508, the pixel voltage is applied to a capacitor (C).

At 510, a discharge current is applied to the capacitor (C).

At 512, optionally, the comparator (306) is enabled. Generally, the comparator (306) will only be enabled if was disabled (i.e., Act 504 is performed). That is, according to some embodiments, the comparator may be continuously enabled. If performed, Act 512 is performed concurrent to Act 510.

At 514, the comparator (306) senses the pixel voltage on the capacitor as the capacitor is discharged.

At 516, the comparator (306) outputs time pulses proportional to the pixel voltage.

At 518, according to some embodiments, the output time pulses are processed by an analog neural network configured for image processing.

While the above description provides examples of one or more apparatus, methods, or systems, it will be appreciated that other apparatus, methods, or systems may be within the scope of the claims as interpreted by one of skill in the art.

The invention claimed is:

1. An analog image processing system, comprising:
   a pixel array comprising a plurality of pixels for sensing light;
   a buffer for sampling a pixel voltage output by each pixel in the pixel array;
   a switch for passing the pixel voltage to a capacitor, wherein the pixel voltage is applied to the capacitor when the switch is on, and wherein a discharge current is applied to the capacitor when the switch is off;
   a comparator configured to sense the pixel voltage on the capacitor as the capacitor is discharged and generate output time pulses proportional to the pixel voltage; and
   an N-type metal oxide semiconductor (NMOS) current source for supplying the discharge current, the current source calibrated to a reference discharge current by a charge-trapped transistor programming a threshold voltage shift into the current source thereby creating a shift in the discharge current.

2. The analog image processing system of claim 1, further comprising:
   an analog neural network for processing the output time pulses, the analog neural network having two or more layers of neurons and synapses comprising programmable weight-storing charge-trapped transistors.

3. The analog image processing system of claim 2, wherein the analog neural network is configured for one or more of: object detection, object classification and image quality enhancement.

4. The analog image processing system of claim 1, wherein the NMOS current source comprises: a standard NMOS transistor, a NMOS charge-trapped transistor, or a combination thereof.

5. The analog image processing system of claim 1, wherein the switch is one of:
   an N-type metal oxide semiconductor (NMOS) transistor, a P-type metal oxide semiconductor (PMOS) transistor and a complementary metal oxide semiconductor (CMOS) switch.

6. The analog image processing system of claim 1, wherein the comparator is disabled when the switch is on and wherein the comparator is enabled when the switch is off.

7. An analog image processing system, comprising:
   a pixel array comprising a plurality of pixels, each pixel having a photo-diode for sensing light;
   a capacitor for storing charge generated from the photo-diode;
   a switch for enabling a discharge from the capacitor;

a comparator configured to sense a diode voltage on the capacitor as the capacitor is discharged and generate an output time pulse proportional to the diode voltage; and an N-type metal oxide semiconductor (NMOS) current source for supplying the discharge current, the current source calibrated to a reference discharge current by a charge-trapped transistor programming a threshold voltage shift into the current source thereby creating a shift in the discharge current.

8. The analog image processing system of claim 7, further comprising:

an analog neural network for processing the output time pulses, the analog neural network having two or more layers of neurons and synapses comprising programmable weight-storing charge-trapped transistors.

9. The analog image processing system of claim 8, wherein the analog neural network is configured for one or more of: object detection, object classification and image quality enhancement.

10. The analog image processing system of claim 7, wherein the NMOS current source comprises: a standard NMOS transistor, a NMOS charge-trapped transistor, or a combination thereof.

11. The analog image processing system of claim 7, wherein the switch is one of:

an N-type metal oxide semiconductor (NMOS) transistor, a P-type metal oxide semiconductor (PMOS) transistor and a complementary metal oxide semiconductor (CMOS) switch.

12. The analog image processing system of claim 7, wherein the capacitor is integral to the photo-diode.

13. The analog image processing system of claim 7, wherein the comparator is disabled when the switch is off and wherein the comparator is enabled when the switch is on.

14. An analog image processing method, comprising:
sampling a pixel voltage from a pixel;
applying the pixel voltage to a capacitor;
applying a discharge current to the capacitor by an N-type metal oxide semiconductor (NMOS) current source calibrated to a reference discharge current by a charge-trapped transistor programming a threshold voltage shift into the current source thereby creating a shift in the discharge current;
sensing the pixel voltage on the capacitor as the capacitor is discharged; and
generating output time pulses proportional to the pixel voltage.

15. The analog image processing method of claim 14, further comprising:
sensing light by the pixel.

16. The analog image processing method of claim 14, further comprising:
disabling a comparator when sampling the pixel voltage.

17. The analog image processing method of claim 14, further comprising:
enabling a comparator when applying the discharge current.

18. The analog image processing method of claim 14, further comprising:
processing the output time pulses by an analog neural network configured for one or more of: object detection, object classification and image quality enhancement.

* * * * *